US006939221B1

(12) United States Patent
Redekop et al.

(10) Patent No.: US 6,939,221 B1
(45) Date of Patent: Sep. 6, 2005

(54) COMBINE HARVESTER WITH A SPREADER HAVING INDEPENDENT SPREAD WIDTH CONTROL

(75) Inventors: Leo Redekop, Saskatoon (CA); Kevin Redekop, Saskatoon (CA); Dean Mayerle, Saskatoon (CA)

(73) Assignee: Redekop Chaff Systems Ltd., Saskatoon (CA)

( * ) Notice: Subject to any disclaimer, the term of this patent is extended or adjusted under 35 U.S.C. 154(b) by 0 days.

(21) Appl. No.: 10/831,359

(22) Filed: Apr. 26, 2004

(51) Int. Cl.[7] .............................................. A01F 12/00
(52) U.S. Cl. ...................................... 460/111; 460/901
(58) Field of Search ..................... 460/112, 111, 901; 239/605

(56) References Cited

U.S. PATENT DOCUMENTS

| | | | |
|---|---|---|---|
| 2,626,159 A | * | 1/1953 | Thompson .................. 239/689 |
| 2,708,582 A | | 5/1955 | Adams |
| 4,489,734 A | * | 12/1984 | Van Overschelde .......... 460/81 |
| 4,669,489 A | * | 6/1987 | Schraeder et al. .......... 460/112 |
| 4,921,469 A | | 5/1990 | Scharf |
| 5,569,081 A | | 10/1996 | Baumgarten et al. |
| 6,082,647 A | | 7/2000 | Claes |
| 6,602,131 B2 | | 8/2003 | Wolters |
| 6,729,953 B2 | * | 5/2004 | Bueermann ................. 460/112 |
| 2002/0072400 A1 | | 6/2002 | Foth |
| 2003/0162576 A1 | | 8/2003 | Bueermann |
| 2004/0043804 A1 | * | 3/2004 | Redekop .................... 460/112 |

* cited by examiner

Primary Examiner—Meredith Petravick
(74) Attorney, Agent, or Firm—Adrian D. Battison; Michael R. Williams; Ryan W. Dupuis

(57) ABSTRACT

A straw and chaff chopper is mounted at the rear hood of a combine harvester and includes a housing with a feed opening and a discharge opening and a rotor mounted in the housing comprising a hub with a plurality of blades mounted on the hub for chopping the fed materials and accelerating the chopped materials for discharge. A tailboard has a plurality of guide fins arranged relative to the housing so as to receive the chopped materials from the discharge opening to engage onto a guide surface and guide fins of the tailboard construction for spreading of the chopped materials. The tailboard is divided longitudinally into first and second separate tailboard portions, each arranged to receive a portion of the chopped materials and each being adjustable in angle to raise and lower independently of the other so as to provide a different spreading effect on the portion received thereon. Fins on the portions prevent the materials entering the gap. Adjustment on the go from the cab can be provided.

41 Claims, 8 Drawing Sheets

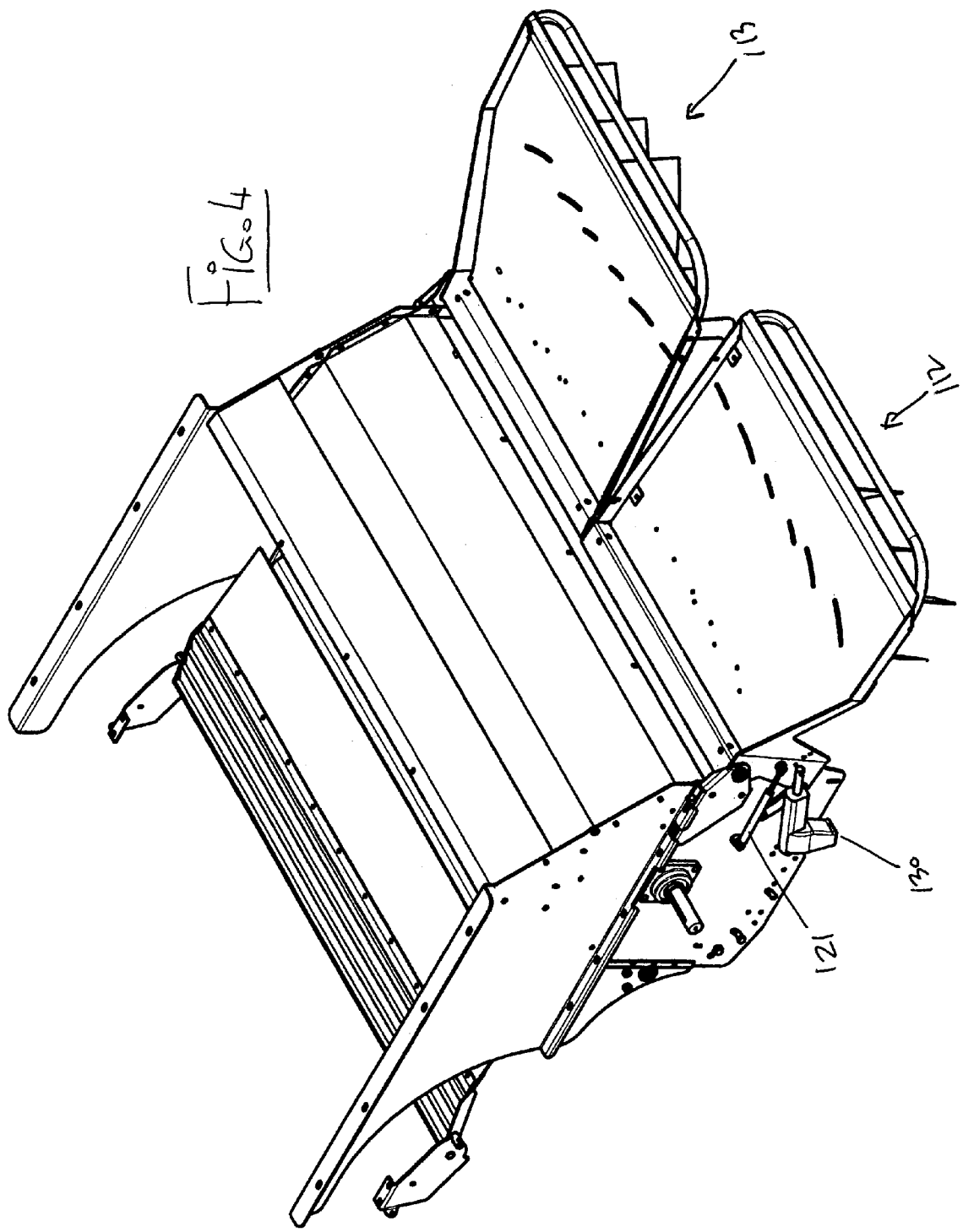

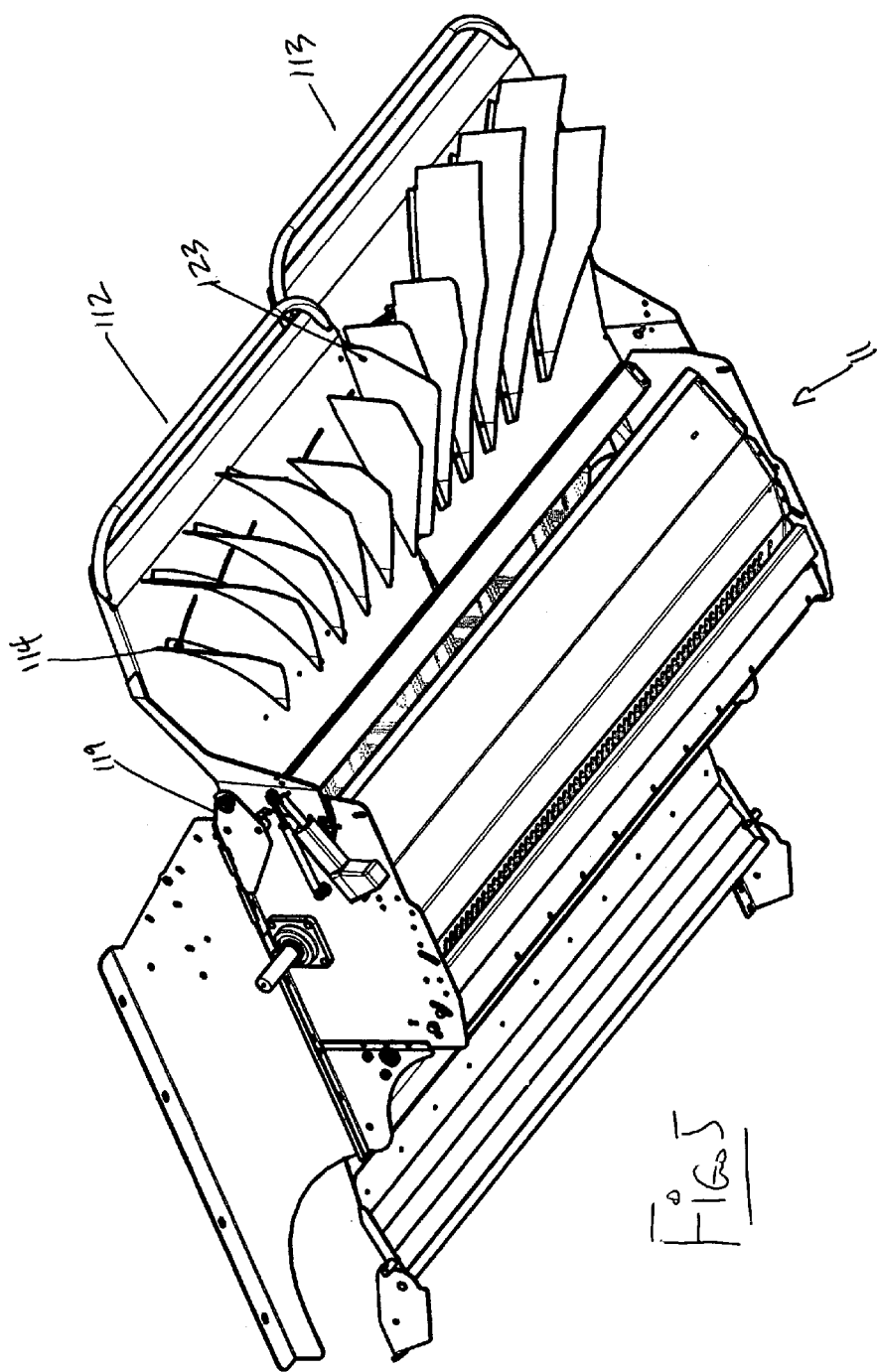

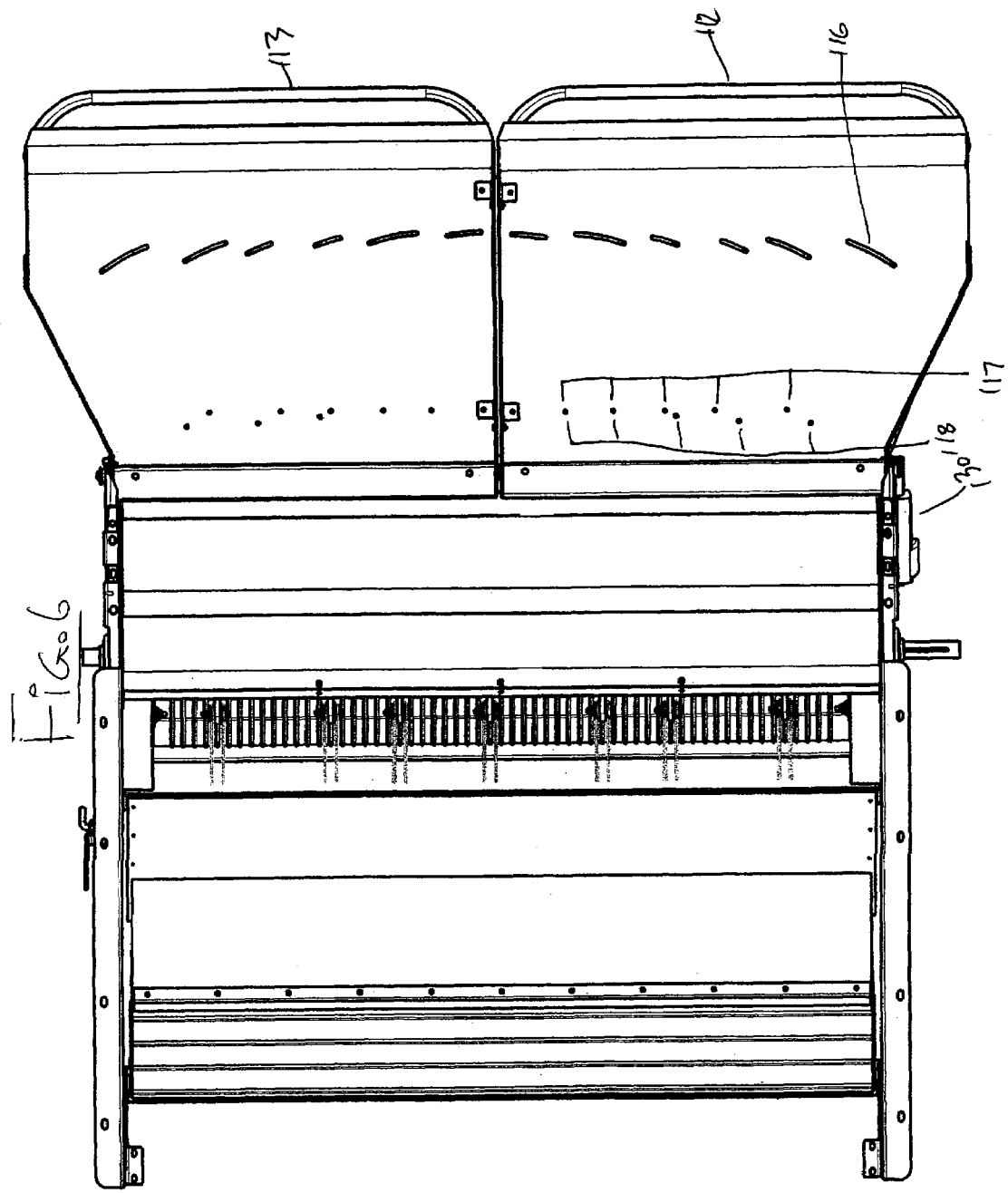

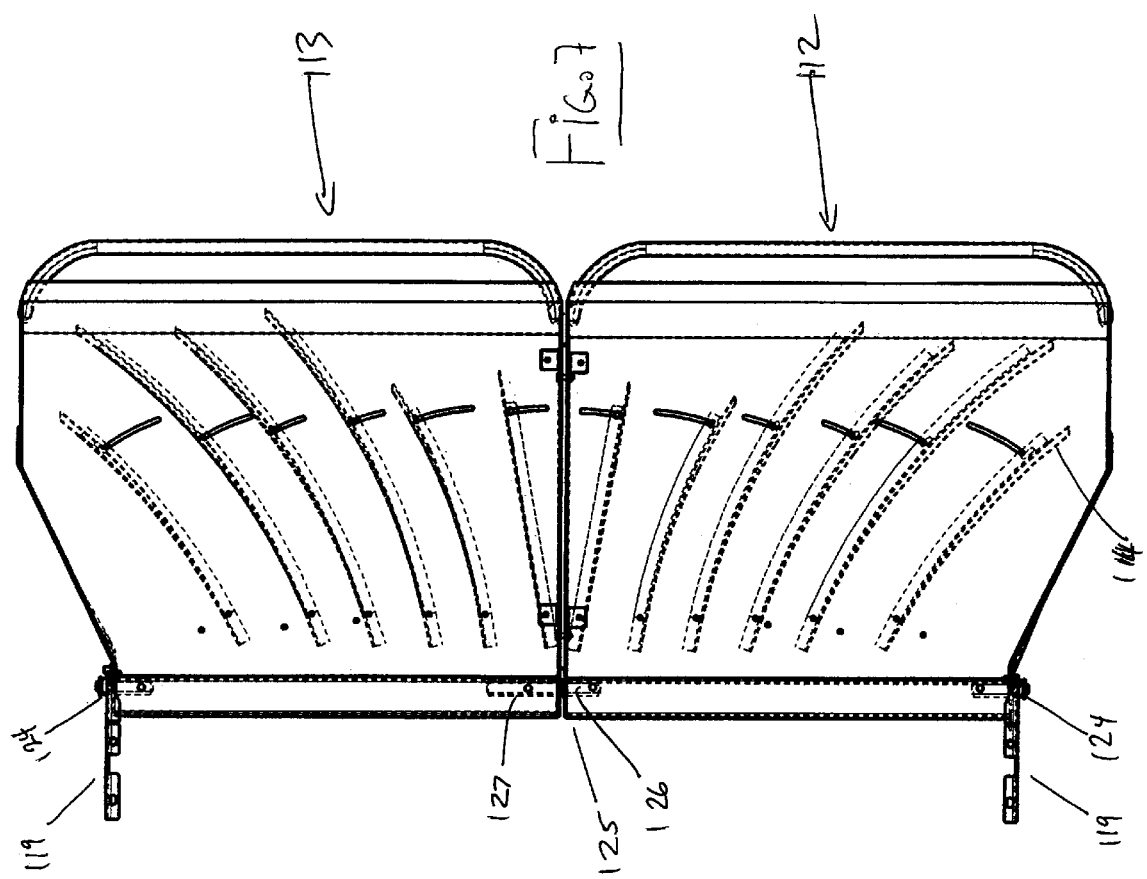

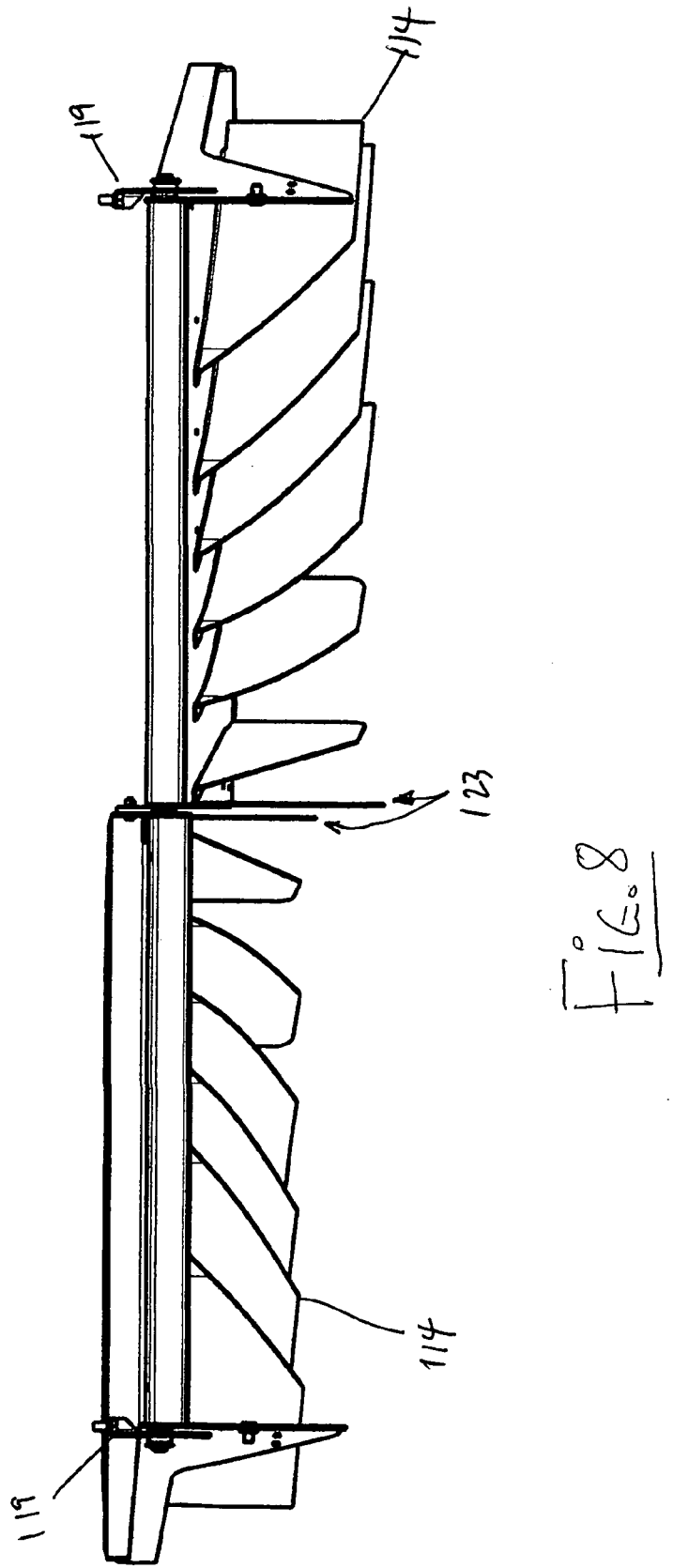

COMBINE HARVESTER WITH A SPREADER HAVING INDEPENDENT SPREAD WIDTH CONTROL

This invention relates to a combine harvester or to a chopper and spreader for use with a combine harvester where there is provided independent spread width control for each side.

BACKGROUND OF THE INVENTION

One of the primary requirements of today's farmers on straw and chaff spreading systems are that they evenly distribute residue over a combine's entire cutting width. Often a straw chopper or spreading mechanism will be able to cover the cutting width of the combine, however equally important is the consistency of the spread.

Variables such as field's terrain, cutting height and wind direction alter the final placement of the residue. The cutting width of the machine may change regularly due to different headers that are quickly attached to the combine for different crops or conditions. The combine's headers can vary from a pick-up header, gathering in a swath that is cut from a pass as wide as 60 feet or as narrow as 18 feet, to an offset mounted 36 foot wide straight cut header. Many farmers want the spread width to be quickly and independently adjustable left to right while maintaining and even distribution of straw across the field. Many farmers would like to do this on the go from the seat of their cab.

Current methods to adjust the spread width involve adjustment of individual fins and/or changing the angle of the tailboard. The tailboard is easily adjusted on most systems however often the fins also need to be adjusted to eliminate the concentration of residue (rowing) in the field. Fin adjustment is very time consuming and is often not well understood by the operator. Typically an operator will adjust the fins once, most times guessing at a position and then living with the results.

Other systems allow similar adjustment of the tailboard and a single adjustment of all fins with a central lever or an electric actuator. These systems are quick and get the operator relatively close however often fine-tuning is never completed because of the complexity of the system and difficult methods to accommodate left to right differentiation.

Problems exist with existing technology. Current methods to manually change the spread width are time consuming and not well understood by the operator. High level of complexity to change spread distribution are problematic including linkages moving fins with individual adjustment.

U.S. Pat. No. 2,708,582—Adams—1955—Details an angular adjustable tailboard with adjustable fins mounted to the tailboard to vary spread width.

U.S. Pat. No. 4,921,469—Scharf—1990—Details a tailboard with a motorized fin control system. The system is designed with a single electric actuator and a linkage to vary the fin position. The linkage is designed to allow one side of the tailboard to position the fins generally straight while the other side is positioned outwards. The mechanism rotates the outer fins more than the inner to provide an even distribution as the spread width changes. An alternate embodiment details each fin set with a separate fully independent control. This is much more complex than the arrangement disclosed herein.

U.S. Pat. No. 5,569,081—Baumgarten—1996—A tailboard with motorized fin controls includes a wind sensor for detecting the speed and direction. In order to compensate for the wind the fins are automatically adjusted for optimum spread. The left and right fin sets are independently controlled.

U.S. Pat. No. 6,082,647—Claes—2000—A split chopper is disclosed with two complete choppers mounted at obtuse angles to each other.

U.S. Pat. No. 6,602,131—Wolters—2003—A flow guide with a horizontal axis is adjustable to vary the spread width U.S. application Ser. No. 2002/0072400—Foth—2002—A tailboard with a motorized fin control where the fins continually move back and forth to eliminate rowing or more evenly distribute the residue.

U.S. application Ser. No. 2003/0162576—Buermann—2003—Fin Control Box/Monitor that is mounted in the cab to control the fin positions—the buttons on the monitor have a first control and a second selective operation.

SUMMARY OF THE INVENTION

It is one object of the invention to provide an improved combine harvester and/or a chopper therefor which provides an improved spread control.

According to one aspect of the invention there is provided a chopper and discharge apparatus arranged to be mounted at the rear hood of a combine harvester for receiving the straw and chaff from the combine harvester and for discharging the materials from the combine harvester, the apparatus comprising:

a housing having a feed opening into which straw and/or chaff can be fed from the combine harvester;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a discharge opening through which the chopped materials are discharged;

a tailboard construction having a plurality of guide fins arranged relative to the housing so as to receive the chopped materials from the discharge opening to engage onto a guide surface and guide fins of the tailboard construction for spreading of the chopped materials;

the tailboard construction extending from the housing and being adjustable so as to raise and lower the tailboard construction to vary the spreading effect on the chopped materials engaging the tailboard construction;

wherein the tailboard construction is divided into first and second separate tailboard portions, each arranged to receive a portion of the chopped materials and each being adjustable to raise and lower independently of the other so as to provide a different spreading effect on the portion received thereon.

In most cases the tailboard is adjustable in angle about a generally transverse axis to provide the generally up and down movements necessary to effect the change of spreading action. However the arrangement can use a tail board construction where the adjustment is made in a different way such as by translational movement or by pivotal movement about an axis which is not transverse but may be inclined or even longitudinal.

Preferably the tailboard is split longitudinally to provide side by side pieces but other arrangements of dividing into two or more pieces can be provided including inclined dividing lines which are diagonal or inclined to both the longitudinal and transverse directions.

Where the portions are pivotal, the pivotal movement may occur about a common transverse axis but this is not essential and the axes may be non-parallel and/or longitudinally off-set.

Preferably the tailboard axis is generally horizontal.

Preferably the tailboard construction is divided into two pieces only which are split is 50/50. However more than two pieces may be used in some circumstances, for example a center sections and two independently adjustable side sections.

Preferably the tailboard construction is divided into two pieces only which are arranged directly side by side.

Preferably there is at least one fin on each tailboard portion

Preferably the fins are adjustable in angle side to side relative to the tailboard portions.

Preferably there is provided an arrangement to prevent chopped materials entering a gap between the tailboard portions. This is preferably effected by each of the tailboard portions at the gap therebetween carrying a fin which extends at least in part along the edge at the gap.

Preferably each tailboard portion has more than one mounting for each fin such that the fins on each portion can be mounted thereon in more than one fin pattern.

Preferably each tailboard portion is adjustable between a number of predetermined discrete positions.

Alternatively each tailboard portion is infinitely adjustable between end positions.

Preferably each tailboard portion is adjusted in angle by a motor operable remotely from the cab/operator's seat.

Preferably each tailboard is adjusted in angle by a motor operable while the combine to which the apparatus is mounted is harvesting.

According to a second aspect of the invention there is provided a combine harvester comprising:
a housing
a straw separating system mounted within the housing for separating seed materials from straw collection of the seed materials and for transport of the straw toward a outlet of the housing for discharge;
a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;
a chopper and discharge apparatus and having a feed opening for receiving the straw and chaff from the combine harvester and for discharging the materials from the combine harvester;
a chopping assembly comprising a hub member mounted for rotation about a longitudinal axis of the hub member and a plurality of blade members mounted on the hub member for rotation therewith about said axis for chopping the fed materials and accelerating the chopped materials for discharge;
and a tailboard construction having a plurality of guide fins arranged relative to the housing so as to receive the chopped materials from the discharge opening to engage onto a guide surface and guide fins of the tailboard construction for spreading of the chopped materials;

the tailboard construction extending from the housing and being adjustable so as to raise and lower the tailboard construction to vary the spreading effect on the chopped materials engaging the tailboard construction;
wherein the tailboard construction is divided into first and second separate tailboard portions, each arranged to receive a portion of the chopped materials and each being adjustable to raise and lower independently of the other so as to provide a different spreading effect on the portion received thereon.

According to a third aspect of the invention there is provided a combine harvester comprising:
a housing
a straw separating system mounted within the housing for separating seed materials from straw for collection of the seed materials and for transport of the straw toward an outlet of the housing for discharge;
a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;
a chaff spreading apparatus mounted behind the sieve assembly and having a feed opening for receiving the chaff from the sieve assembly and for discharging the materials from the combine harvester in a spread pattern;
the chaff spreading apparatus including two separate chaff spreading portions each arranged to receive a portion of the chaff and each being adjustable in independently of the other so as to provide a different spreading effect on the portion received thereon.

Certain objective of the invention which may be provided by the arrangements described in detail hereinafter are as follows:

Simplified and cost reduced method to quickly change spread width;

Simplified and cost reduced method of adjusting spread distribution;

Enhanced method to control the change—from the cab;

Increase in reliability/reduction of parts;

Allows a higher level of manufacturing assembly two components that are easier to move/handle.

BRIEF DESCRIPTION OF THE DRAWINGS

One embodiment of the invention will now be described in conjunction with the accompanying drawings in which;

FIG. 4 is an isometric view of the chopper and spreading system only of FIG. 1 from the top and one side.

FIG. 5 is an isometric view of the chopper and spreading system only of FIG. 1 from the bottom and the one side.

FIG. 6 is a top plan view of the chopper and spreading system only of FIG. 1.

FIG. 7 is a top plan view of the tailboard only of FIG. 1 showing components in phantom.

FIG. 8 is a front elevational view of the tailboard only of FIG. 1.

In the drawings like characters of reference indicate corresponding parts in the different figures.

DETAILED DESCRIPTION

Figure 1:
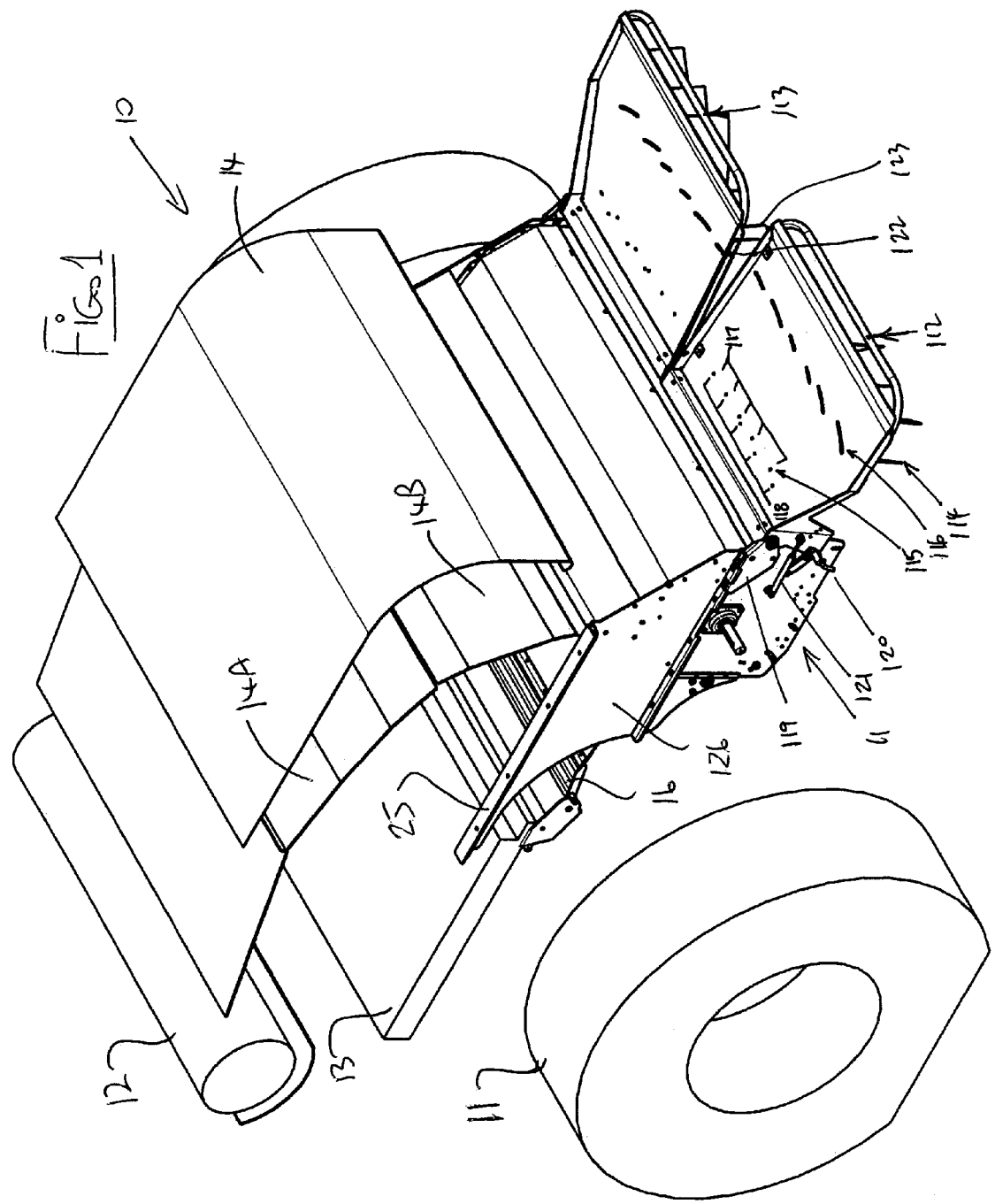
FIG. 1 is an isometric view of a rear section of a combine harvester showing many components schematically and including a spreading arrangement in accordance with the present invention.
Figure 2:
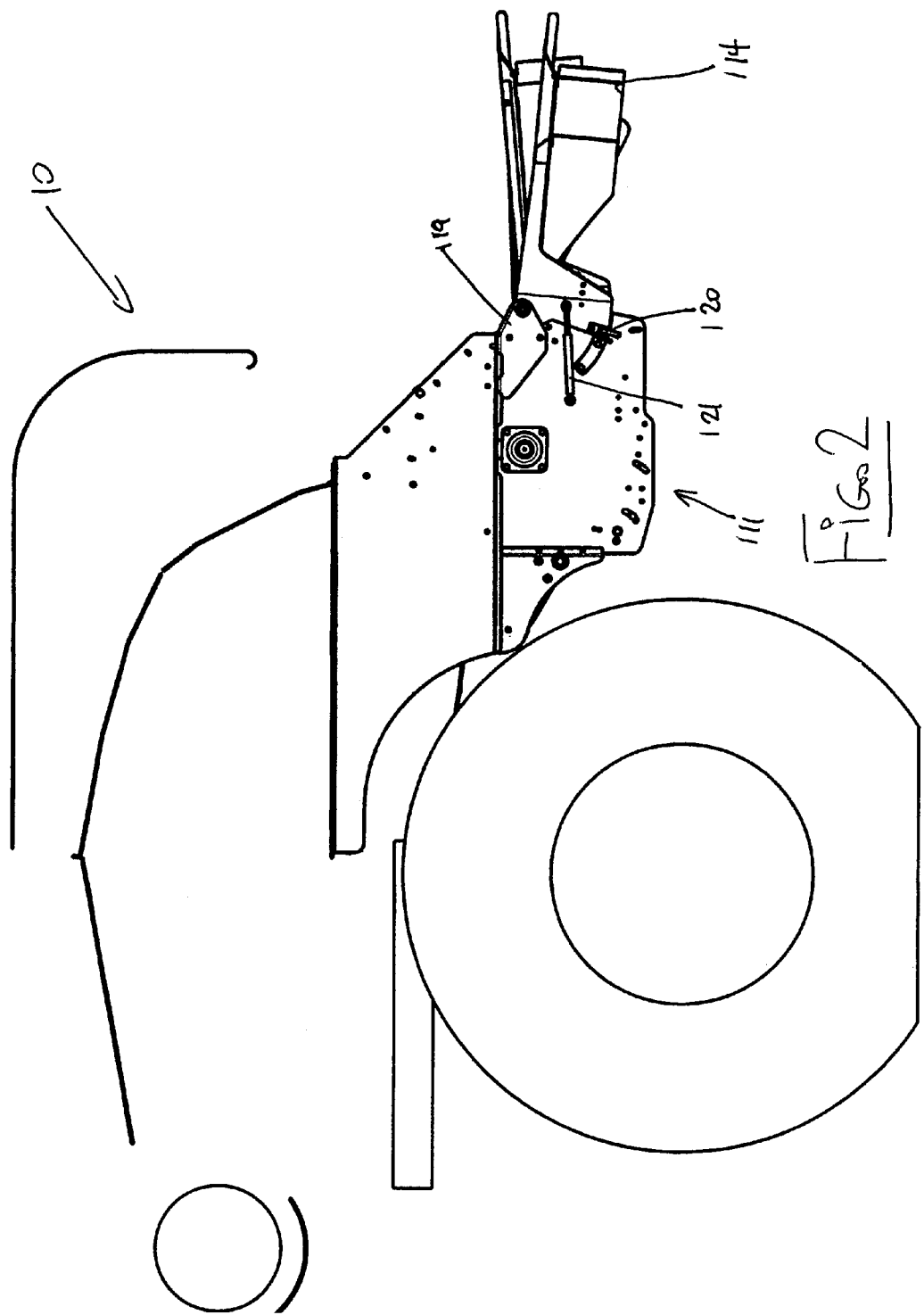
FIG. 2 is a side elevational view of the components of FIG. 1.

A combine harvester shown in FIG. 1 comprises a combine harvester housing 10 mounted on ground wheels 11 for transport over a ground in conventional manner. The combine harvester is shown only schematically since many different designs are available and well known to one skilled in the art. The combine harvester includes a straw separation section generally indicated at 12 and a sieve section generally indicated at 13. Again these elements are conventional and provide arrangements for separation of the straw from the crop material allowing the seed material to fall through to the sieve at which seeds are separated from the seed material leaving the chaff or other lighter materials on top of the sieve to be carried way from the sieve by an air flow through the sieve as is well known.

The rear of the combine is provided is a rear hood 14 into which air from the straw separation system and the sieves enters and into which straw is discharged rearwardly for and is guided by guide wall 14A and by operable guide panel 14B in the hood section 14 into a chopper and spreader generally indicated at 15.

This arrangement is well known and commercial products are readily available from Redekop Manufacturing and other manufacturers of straw choppers of this type.

Figure 3:
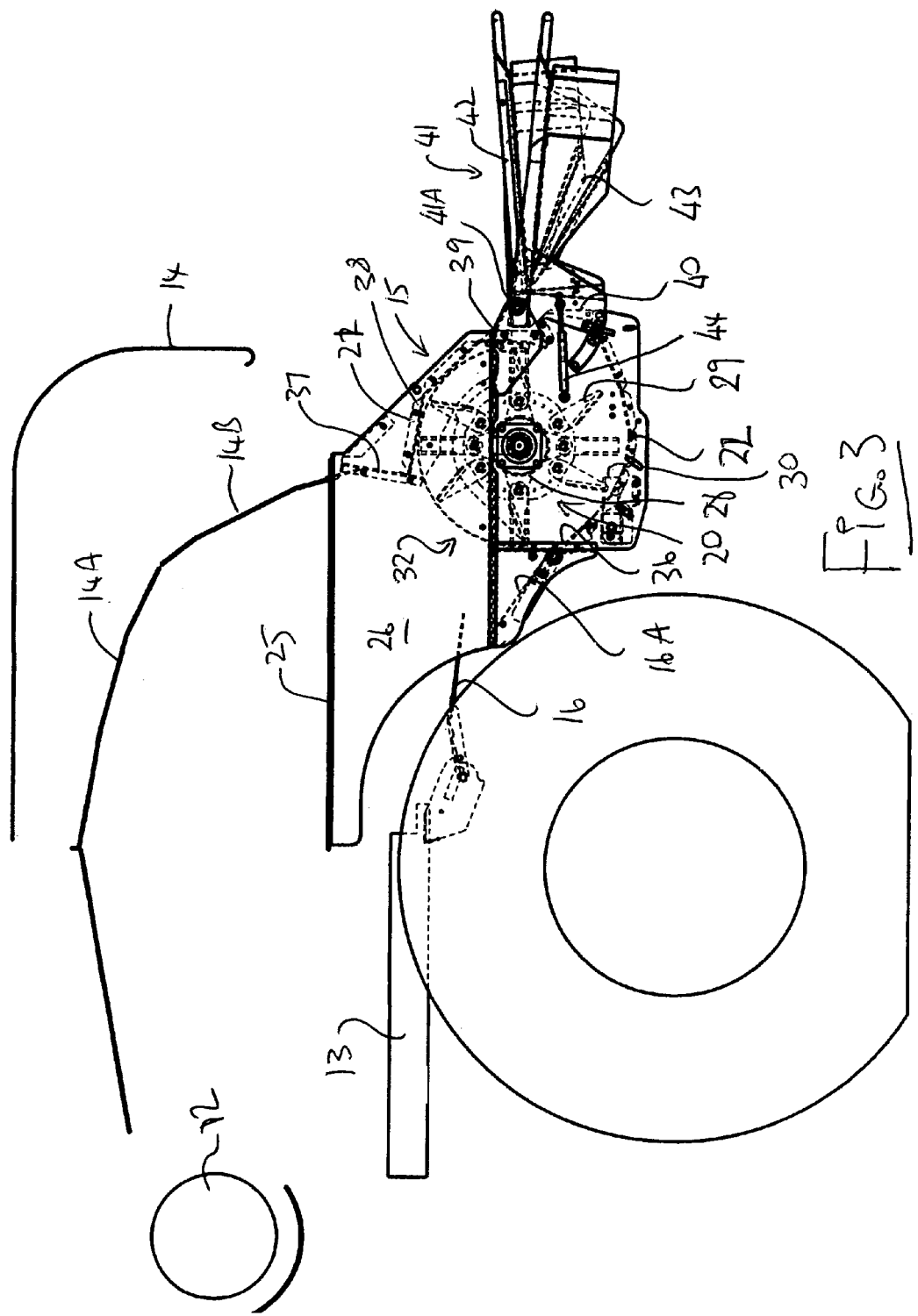
FIG. 3 is a side elevational view of the components of FIG. 1 showing internal components in phantom.

The chaff from the rear end of the sieve as best shown in FIG. 3 at 13 is carried by a movable pan 16 and a chaff control door 16A into the inlet 32 of the chopper 15.

An example of a chopper of this type is disclosed in U.S. Pat. Nos. 6,478,674 issued Nov. 12, 2002, 5,482,508 issued Jan 9, 1996 and 5,232,405 issued Aug. 3, 1993 all of Leo Redekop, and U.S. application Ser. No. 2002/0004417 published Jan. 10, 2002 the disclosures of which are incorporated herein by reference.

The chopper has a horizontal upper mounting flange 25 which attaches to a corresponding bottom flange of the hood of the combine. This forms a rectangular open mouth at the top of the chopper which corresponds in shape to the rectangular lower opening of the hood so that all material discharging from the guide walls 14A and 14B falls into the upper part of the housing and enters the inlet 32 of the chopper.

The chopper comprises a housing attached to the top mounting flange and depending therefrom and defined by side walls 26 at opposite sides of the hood and generally co-planar therewith. Bridging the side walls 26 is provided a bottom wall 22 and a top wall 21 which extend across the width of the chopper and form a generally cylindrical containing surface for receiving the chopper rotor 20. The rotor 20 includes a hub 28 with a plurality of radially extending flails or blades 29 carried on the rotor for rotation therewith around the axis of the rotor which is arranged across the width of the chopper.

Many different arrangements and construction of blade can be used as are well known to one skilled in the art and described in the above patents of Redekop. In most cases the chopper includes stationary blades 30 mounted on the bottom wall 22 at a position pathway around the bottom wall. The stationary blades are arranged in a row at spaced positions across the width of the chopper so as to co-operate with the rotating blades of the hub in a chopping action. The spacing between the blades can be selected in accordance with the type of rotating blades as is well known to one skilled in the art.

The top wall 21 and the bottom wall 22 define at the upper part of the housing the inlet 32 into which the straw can be guided from the hood and from the sieve 13. The chaff guide plate 16 and control door 16A carry the chaff from the end of the sieve over the space between the end of the sieve and the front edge 36 of the bottom wall 22 so as to carry the chaff in the air stream from the sieve over the plate and into the opening 32.

The top wall 21 includes a generally vertical portion 37 which extends downwardly from the top flange 25 to the top of the rotor. The top wall 21 further includes a curved section 38 which extends around the top of the rotor to a rear edge 39 which defines the top edge of the rear discharge opening 40 through which the material exists in the stream of air and chopped materials generated by the rotation of the rotor within the housing.

A tailboard 41 is pivotally mounted on the rear part of the housing at a pivot mount 41A. The tailboard comprises a base plate 42 with a series of fins 43 on the underside shaped and arranged so that material exiting from the discharge opening 40 is thrown up against the underside of the tailboard and impacts the fins causing a change in direction of the material on the tailboard so as to spread the material using the momentum generated in the stream from the rotor. The angle of the tailboard can be adjusted around the pivot 41A by positioning a spring loaded pin. The load of the tailboard is counteracted with a gas cylinder 44.

In the arrangement particularly described herein, the chopper 15 has been configured with a left and a right tailboard portions 112 and 113. Each tailboard portion incorporates six fins 114 that pivot about front holes 115 and are fixed along a back slot 116. This tailboard incorporates a first leading edge fin placement 117 and a second placement 118 with a common corresponding rear slot 116. The fins in all drawings are shown in the first pattern. The first fin placement 117 is used for a high air velocity rotor (fan end rotor) and optimizes the product spread on a wide spread pattern. The second placement pattern 118 is utilized with a traditional rotor most often used with narrow spread aggressive cutter chopper—low air velocities.

The left and right tailboards are mounted to the straw chopper 111 with side plates 119. Side plates 119 are mounted to the chopper flange in such a way that the tailboard assembly can be removed from the chopper without dismantling the rest of the chopper. The tailboard's angular position is fixed with a spring-loaded pin 120 in a slot on each side of the straw chopper. A gas spring 121 on each side of the housing counter balances the weight of the tailboard allowing the operator to easily adjust each of the tailboards positions. The tailboards can be bolted together for initial installation with bolts through holes 122 however once the assembly is attached to the chopper each tailboard is fully adjustable independent of each other.

Inner fin 123 on each tailboard is designed to keep straw from plugging in the gap between the two tailboards. The shape of the fin matches the side profile of the gap between the two tailboards when they are adjusted to their extremities. This minimizes the straw build-up on the top of the tailboards and stops a blunt scissor effect and associated torque increase to change angular positions if straw was draped through the space between the tailboards.

The tailboards pivot on a common axis. The axis is defined by the pivot 124 in each side plate 119 and the center pivot 125. The left tailboard 112 incorporates a long center pin 126), which matched a receiver 127 with bushings on the right tailboard 113. This eliminates the alignment requirement for a long pin through both tailboards.

FIG. 4 shows the invention with an electric actuator 130 operable by a remote control from the cab mounted to each side of each tailboard. In this case the spring loaded pin assembly 120 is removed from each tailboard and actuator mounted. The gas spring 121 remains mounted to the tailboard to reduce the shock load and rotational loads encountered by the actuator 130. The left actuator is able to rotate the left tailboard and while the right actuator independently controls the position of the right tailboard 113 thereby altering the left and right spread width from the cab with a controller and monitor.

The monitor/controller in the cab includes 3 buttons that position the tailboards in memorized positions, along with the means to adjust and save the memorized positions. This allows the operator to set both the left and right tailboard while operating in one position, then when coming back in the opposite direction have a second memorized position for both tailboards, then have a third position if he were to travel in a direction other than the 2 previous. This takes care of typical harvesting patterns: 1—back and forth, 2—traveling around a square field, but of course there could be as many memorized positions as feasible.

Adjusting both tailboards down 5 degrees will reduce the total spread width by 5 ft; therefore if one tailboard is adjusted down 5 degrees the spread to that side from the centerline will be reduced by 2.5 ft. The tailboard when adjusted with the spring-loaded pin has positions set 5 degrees apart from 5 degrees above horizontal to 20 degrees below. This means that it can be adjusted so that one side of the chopper is arranged to spread only 7.5 ft from the center while the other side spreads 20 ft. This is enough range for compensating for wind on even an offset header.

In an alternate embodiment (not shown) a chaff spreader with split adjustment can be provided. In particular, AGCO provides an arrangement which mounts the same (small) tailboard behind both their sieves and the chopper. the tailboard behind the sieves acts as a simple chaff spreader and the split tailboard described herein can be mounted behind their sieves with the advantages mentioned above.

In a further alternative arrangement (not shown) the split tailboard is not attached to a chopper housing but instead it is attached to the rear hood of a combine with an internal chopper.

Since various modifications can be made in my invention as herein above described, and many apparently widely different embodiments of same made within the spirit and scope of the Claims without department from such spirit and scope, it is intended that all matter contained in the accompanying specification shall be interpreted as illustrative only and not in a limited sense.

What is claimed is:

1. A chopper and discharge apparatus arranged to be mounted at the hood of a combine harvester for receiving the straw and/or chaff from the combine harvester and for discharging the materials from the combine harvester, the apparatus comprising:

a housing having a feed opening into which straw and/or chaff can be fed from the combine harvester;

a chopper assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a discharge opening through which the chopped materials are discharged;

the housing having and the chopping assembly being arranged such that the straw and/or chaff enters into the feed opening as a single stream extending substantially across the width of the housing and chopping assembly and discharges as a single stream extending substantially across the width of the housing and chopping assembly;

a tailboard construction arranged relative to the housing so as to receive the single stream of chopped materials from the discharge opening to engage onto a guide surface of the tailboard construction for spreading of the chopped materials;

the tailboard construction extending from the housing and being adjustable so as to raise and lower the tailboard construction to vary the spreading effect on the single stream of chopped materials engaging the tailboard construction;

wherein the tailboard construction is divided into separate tailboard portions arranged side by side across the single stream of chopped materials, each arranged to receive a portion of the single stream of chopped materials and each being adjustable independently of the other or others so as to provide a different spreading effect on the portion received thereon.

2. The apparatus according to claim 1 wherein the tailboard portions are pivotal about an axis which is generally horizontal.

3. The apparatus according to claim 1 wherein the tailboard construction is divided into two side by side portions only which are split 50/50.

4. The straw chopper according to claim 1 wherein there is at least one guide fin on each tailboard portion.

5. The straw chopper according to claim 1 wherein the tailboard portions each include a plurality of guide fins which are adjustable in angle side to side relative to the tailboard portions.

6. The straw chopper according to claim 5 wherein each tailboard portion has more than one mounting for each fin such that the fins on each portion can be mounted thereon in more than one fin pattern.

7. The straw chopper according to claim 1 wherein each tailboard portion is adjustable between a number of predetermined discrete positions.

8. The straw chopper according to claim 1 wherein each tailboard portion is infinitely adjustable between end positions.

9. The straw chopper according to claim 1 wherein each tailored portion is adjustable by a motor operable from a cab/operator's seat of the combine harvester.

10. The straw chopper according to claim 1 wherein each tailboard portion is adjustable by a motor operable while the combine harvester to which the apparatus is mounted is harvesting.

11. A chopper and discharge apparatus arranged to be mounted at the hood of a combine harvester for receiving the straw and/or chaff from the combine harvester and for discharging the materials from the combine harvester, the apparatus comprising:

a housing having a feed opening into which straw and/or chaff can be fed from the common harvester;

a chopping assembly mounted in the housing and comprising a hub member mounted for rotation about a longitudinal axis of the hub member and a plurality of blade members mounted on the hub member for rotation therewith about said axis for chopping the fed materials and accelerating the chopped materials for discharge;

the housing having a discharge opening through which the chopped materials are discharged;

a tailboard construction arranged relative to the housing so as to receive the chopped material from the discharge opening to engage onto a guide surface of the tailboard construction for spreading of the chopped materials;

the tailboard construction extending from the housing and being adjustable so as to raise and lower the tailboard construction to vary the spreading effect on the chopped materials engaging the tailboard construction;

wherein the tailboard construction is divided into separate tailboard portions, each arranged to receive a portion of the chopped materials and each being adjustable independently of the other or others so as to provide a different spreading effect on the portion received thereon;

wherein the separate tailboard portions are arranged directly side by side.

12. The straw chopper according to claim 11 wherein there is provided an arrangement to prevent chopped materials entering a gap between adjacent side edges of the side by side tailboard portions.

13. The straw chopper according to claim 12 wherein the arrangement to prevent chopped materials entering the gap comprises, on each of the tailboard portions, a guide fin which extends at least in part along a respective one of the side edges at the gap.

14. A combine harvester comprising:

a housing a straw separating system mounted within the housing for separating seed materials from straw for collection of the seed materials and for transport of the straw towards the housing outlet for discharge;

a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;

a chopper and discharge apparatus having a feed opening for receiving the straw and chaff from the combine harvester and a discharge opening for discharging the materials from the combine harvester and a chopping assembly comprising a hub member mounted for rotation about a longitudinal axis of the hub member and a plurality of blade members mounted on the hub member for rotation therewith about said axis for chopping the fed materials and accelerating the chopped materials for discharge through the discharge opening;

the chopper and discharge apparatus being arranged such that the straw and chaff enters into the feed opening as a single stream extending substantially across the width of the chopper and discharge apparatus and discharges through the discharge opening as a single stream extending substantially across the width of the chopper and discharge apparatus;

and a tailboard construction arranged relative to the housing of the combine harvester so as to receive the single stream of chopped materials from the discharge opening to engage onto a guide surface of the tailboard construction for spreading of the chopped materials;

the tailboard construction extending from the housing of the combine harvester and being adjustable so as to raise and lower the tailboard construction to vary the spreading effect on the single stream of chopped materials engaging the tailboard construction;

wherein the tailboard construction is divided into separate tailboard portions arranged side by side across the single stream of chopped materials, each arranged to receive a portion of the single stream of chopped materials and each being adjustable independently of the other or others so as to provide a different spreading effect on the portion received thereon.

15. The combine harvester according to claim 14 wherein the chopper is internal within the housing.

16. The combine harvester according to claim 14 wherein the housing has a rear hood and the chopper is carried on the rear hood.

17. The combine harvester according to claim 14 wherein the tailboard portions are pivotal about an axis which is generally horizontal.

18. The combine harvester according to claim 14 wherein the tailboard construction is divided into two side by side portions only which are split 50/50.

19. The combine harvester according to claim 14 wherein there is at least one guide fin on each tailboard portion.

20. The combine harvester according to claim 19 wherein the fins are adjustable in angle side to side relative to the tailboard portions.

21. The combine harvester according to claim 19 wherein each tailboard portion has more than one mounting for each fin such that the fins on each portion can be mounted thereon in more than one fin pattern.

22. The combine harvester according to claim 14 wherein each tailboard portion is adjustable between a number of predetermined discrete positions.

23. The combine harvester according to claim 14 wherein each tailboard portion is infinitely adjustable between end positions.

24. The combine harvester according to claim 14 wherein each tailboard portion is adjustable by a motor operable from a cab/operator's seat of the combine harvester.

25. The combine harvester according to claim 14 wherein each tailboard portion is adjustable by a motor operable while the combine harvester is harvesting.

26. A combine harvester comprising:

a housing a straw separating system mounted within the housing for separating seed materials from straw for collection of the seed materials and for transport of the straw towards the housing outlet for discharge;

a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;

a chopper and discharge apparatus having a feed opening for receiving the straw and chaff from the combine harvester and a discharge opening for discharging the materials from the combine harvester and a chopping assembly comprising a hub member mounted for rotation about a longitudinal axis of the hub member and a plurality of blade members mounted on the hub member for rotation therewith about said axis for chopping the fed materials and accelerating the chopped materials for discharge through the discharge opening;

and a tailboard construction arranged relative to the housing of the combine harvester so as to receive the chopped materials from the discharge opening to engage onto a guide surface of the tailboard construction for spreading of the chopped materials;

the tailboard construction extending from the housing of the combine harvester and being adjustable so as to raise and lower the tailboard construction to vary the spreading effect on the chopped materials engaging the tailboard construction;

wherein the tailboard construction is divided into separate tailboard portions, each arranged to receive a portion of the chopped materials and each being adjustable independently of the other or others so as to provide a different spreading effect on the portion received thereon;

wherein the separate tailboard portions are arranged directly side by side.

27. The combine harvester according to claim 26 wherein there is provided an arrangement to prevent chopped materials entering a gap between adjacent side edges of the side by side tailboard portions.

28. The combine harvester according to claim 27 wherein the arrangement to prevent chopped materials entering the gap comprises, on each of the tailboard portions, a guide fin which extends at least in part along a respective one of the side edges at the gap.

29. A combine harvester comprising:

a housing a straw separating system mounted within the housing for separating seed materials from straw for collection of the seed materials and for transport of the straw toward the housing outlet for discharge;

a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly end a rear edge over which the lighter materials are discharged in the air flow;

a chaff spreading apparatus mounted behind the sieve assembly and having a feed opening for receiving the chaff from the sieve assembly and for discharging the chaff from the combine harvester in a spread pattern;

wherein the chaff spreading apparatus includes a tailboard construction arranged relative to the spreading apparatus so as to receive the chaff to engage onto a guide surface of the tailboard construction for spreading of the chaff;

the tailboard construction extending from the housing and being adjustable so as to raise and lower the tailboard construction to vary the spreading effect on the chaff engaging the tailboard construction;

wherein the tailboard construction is divided into separate tailboard portions, each arranged to receive a portion of the chaff and each being adjustable independently of the other so as to provide a different spreading effect on the portion received thereon; and wherein the separate tailboard portions are arranged directly side by side.

30. The combine harvester according to claim 29 wherein the tailboard portions are pivotal about an axis which is generally horizontal.

31. The combine harvester according to claim 29 wherein the tailboard construction extends generally laterally of the housing.

32. The combine harvester according to claim 29 wherein the tailboard construction is divided into two side by side portions only which are split 50/50.

33. The combine harvester according to claim 29 wherein there is at least one guide fin on each tailboard portion.

34. The combine harvester according to claim 19 wherein the tailboard portions each include a plurality of guide fins which are adjustable in angle side to side relative to the tailboard portions.

35. The combine harvester according to claim 29 wherein there is provided an arrangement to prevent chopped materials entering a gap between adjacent side edges of the side by side tailboard portions.

36. The combine harvester according to claim 35 wherein the arrangement to prevent chopped materials entering the gap comprises, on each of the tailboard portions, a guide fin which extends at least in part along a respective one of the side edges at the gap.

37. The combine harvester according to claim 33 wherein each tailboard portion has more than one mounting for each fin such that the fins on each portion can be mounted thereon in more than one fin pattern.

38. The combine harvester according to claim 29 wherein each tailboard portion is adjustable between a number of predetermined discrete positions.

39. The combine harvester according to claim 29 wherein each tailboard portion is infinitely adjustable between end positions.

40. The combine harvester according to claim 29 wherein each tailboard portion is adjustable by a motor operable from a cab/operator's seat of the combine harvester.

41. The combine harvester according to claim 29 wherein each tailboard portion is adjustable by a motor operable while the combine harvester is harvesting.

* * * * *